United States Patent
Yazaki et al.

[11] Patent Number: 5,296,304
[45] Date of Patent: Mar. 22, 1994

[54] LAMINATE FILM FOR STRETCH-WRAPPING AND PROCESS FOR PRODUCING THE SAME

[75] Inventors: Takao Yazaki; Masataka Noro; Takashi Matsui, all of Mie, Japan

[73] Assignee: Mitsubishi Petrochemical Co., Ltd., Tokyo, Japan

[21] Appl. No.: 831,350

[22] Filed: Feb. 5, 1992

[30] Foreign Application Priority Data

Feb. 26, 1991 [JP] Japan .................. 3-030582

[51] Int. Cl.$^5$ .................. B32B 27/28; B32B 27/32
[52] U.S. Cl. .................. 428/516; 428/517; 428/518; 428/520
[58] Field of Search ........... 428/516, 518, 520, 480, 428/483, 517

[56] References Cited

U.S. PATENT DOCUMENTS

| | | | |
|---|---|---|---|
| 3,333,024 | 7/1967 | Haefele et al. | 525/314 |
| 3,465,063 | 9/1969 | Hassell et al. | 525/314 |
| 3,741,253 | 6/1973 | Brax et al. | 428/520 |
| 3,882,259 | 5/1975 | Nohara et al. | 428/516 |
| 4,207,363 | 6/1980 | Lustig et al. | 428/517 |
| 4,619,859 | 10/1986 | Yoshimura et al. | 428/213 |
| 4,713,282 | 12/1987 | Yazaki et al. | 428/516 |
| 4,897,274 | 1/1990 | Candida et al. | 428/517 |

FOREIGN PATENT DOCUMENTS

| | | |
|---|---|---|
| 0198091 | 10/1986 | European Pat. Off. |
| 0265544 | 5/1988 | European Pat. Off. |
| 3527436 | 2/1987 | Fed. Rep. of Germany |
| 61-89040 | 5/1986 | Japan |
| 1020720 | 2/1966 | United Kingdom |

OTHER PUBLICATIONS

Database WPIL, Derwent Publications, Ltd., AN 87-104693 & JP-A-62 51 440, Mar. 6, 1987, "Stretch Wrap Film for Food Etc.-Comprises Hydrogenated Block Copolymer Layer with Ethylene-Vinyl-Acetate Copolymer Resin Layers on Both Sides".

*Primary Examiner*—Ellis P. Robinson
*Assistant Examiner*—Rena L. Dye
*Attorney, Agent, or Firm*—Oblon, Spivak, McClelland, Maier & Neustadt

[57] ABSTRACT

A laminate film for stretch-wrapping is disclosed, comprising an intermediate layer containing from 50 to 95% by weight of an ethylene-α-olefin copolymer, a propylene-ethylene-α-olefin random copolymer, a propylene-α-olefin random copolymer, a butene-1 homopolymer, or a butene-1-ethylene copolymer and from 5 to 50% by weight of a hydrogenated block copolymer elastomer having laminated on both sides thereof a surface layer comprising from 75 to 95% by weight of ethylene and from 5 to 25% by weight of vinyl acetate. The film is excellent in stretchability, softness, tear strength, and in particular deformation recovery properties.

15 Claims, 1 Drawing Sheet

LAMINATE FILM FOR STRETCH-WRAPPING AND PROCESS FOR PRODUCING THE SAME

FIELD OF THE INVENTION

This invention relates to a laminate film for stretch-wrapping of foods and a process for producing the same.

BACKGROUND OF THE INVENTION

In the field of latest stretch-wrapping of foods, such as vegetables and fruits, fishes, meats, and cooked foods, either as they are or placed on a plastic tray, i.e., so-called prewrapping with plastic films, use of ethylene resins such as low-density polyethylene resins and ethylene-vinyl acetate copolymer resins, have been studied with keenness as substitutes for conventionally employed polyvinyl chloride films from safety and hygiene considerations.

However, films of known low-density polyethylene resins, e.g., low-density polyethylene and an ethylene-butene-1 copolymer, are hard and difficult to apply to stretch-wrapping. Forced stretching of these films only results in breakage or non-uniform stretching of the film or causes deformation or breakage of the tray with a food on to wrinkle the film, failing to obtain necessary tension or to achieve commercially valuable wrapping.

Films of an ethylene-vinyl acetate copolymer resin, with its vinyl acetate content, melt flow rate, etc. being properly selected, would be freed from the above-described problems associated with low-density polyethylene resin films. However, when they are used in stretch-wrapping of sharp-edged foods or trays, they are torn at the sharp edge. Moreover, any small initial tear of the film which may be made during distribution of wrapped articles runs or spreads into a big tear, eventually leading to unwrapping.

A laminate film composed of the above-mentioned low-density polyethylene resin film and ethylene-vinyl acetate copolymer resin film settles the problems of hardness and non-stretchability but still leaves the problems of easy tearing during wrapping or distribution, particularly with a reduced film thickness.

In order to overcome these disadvantages associated with the conventional stretch-wrapping films, a laminate film composed of an intermediate layer mainly comprising a specific butene-1 polymer resin having laminated on both sides thereof a layer mainly comprising an ethylene-vinyl acetate copolymer resin having a vinyl acetate content of from 5 to 25% by weight which is obtained by blown-film extrusion at a blow-up ratio of from 3 to 7 has been proposed aiming to provide a thin stretch-packing film which is excellent in stretchability, softness and particularly tear strength as well as moderate slip, self-adhesion, sufficient heat-sealability, and transparency, as disclosed in JP-A-61-89040 (the term "JP-A" as used herein means an "unexamined published Japanese patent application").

Nevertheless, even the above-described stretch-wrapping film does not always satisfy market demands for wrapping with tension fit to the shape of articles to be wrapped without leaving wrinkles and for deformation recovery properties, such as recovery from deformation under load during delivery or display without leaving wrinkles.

Further, U.S. Pat. No. 4,713,282 (corresponding to JP-A-61-4463) discloses a laminate film for stretch-wrapping composed of a layer mainly comprising a propylene-α-olefin random copolymer resin having laminated on both sides thereof a layer mainly comprising an ethylene-vinyl acetate copolymer resin having a vinyl acetate content of from 5 to 25% by weight. The proposed film is still unsatisfactory to meet the market demand for deformation recovery properties.

SUMMARY OF THE INVENTION

The present invention has been accomplished in an attempt to improve deformation recovery of stretch-wrapping films for foods.

An object of this invention is to provide a stretch-wrapping film which is excellent in stretchability, softness, tear strength, and in particular deformation recovery properties as well as other properties, such as moderate slip properties required for application to automatic stretch-wrapping machines, self-tack, sufficient heat sealability, heat resistance during heat sealing, and transparency.

The present invention relates to a laminate film for stretch-wrapping which comprises an intermediate layer containing from 50 to 95% by weight of at least one member selected from the group (A) consisting of (A-1) an ethylene-α-olefin copolymer comprising ethylene and an α-olefin having from 4 to 8 carbon atoms, having an α-olefin content of from 2 to 20% by weight, and having a melt flow rate (MFR) of from 0.1 to 5 g/10 min at 190° C., (A-2) a propylene-ethylene-α-olefin random copolymer or propylene-α-olefin random copolymer comprising propylene, ethylene and/or an α-olefin having from 4 to 8 carbon atoms, having an ethylene and/or α-olefin content of from 4 to 19% by weight and a propylene content of from 81 to 96% by weight, and having an MFR of from 1 to 10 g/10 min at 230° C., and (A-3) a butene-1 homopolymer or butene-1-ethylene copolymer having an ethylene content of from 0.1 to 10% by weight (hereinafter inclusively referred to as a butene-1 polymer) having an MFR of from 0.1 to 10 g/10 min at 190° C. and from 5 to 50% by weight of at least one member selected from the group (B) consisting of (B-1) a hydrogenated block copolymer elastomer which is a hydrogenation product of a block copolymer containing, in the molecule thereof, from 5 to 70% by weight of a polymer block mainly comprising an alkenyl aromatic compound and from 30 to 95% by weight of a polymer block mainly comprising a conjugated diene compound, (B-2) 1,2-polybutadiene having a 1,2-bond content of at least 90% and an MFR of from 0.5 to 5 g/10 min at 150° C., and (B-3) an ethylene-propylene copolymer elastomer or ethylene-butene-1 copolymer elastomer comprising ethylene and propylene or butene-1, having a propylene or butene-1 content of from 10 to 30% by weight, and having an MFR of from 0.2 to 5 g/10 min at 190° C., having laminated on both sides thereof a surface layer comprising an ethylene resin selected from the group (C) consisting of (C-1) a copolymer comprising from 75 to 95% by weight of ethylene and from 5 to 25% by weight of vinyl acetate, (C-2) a copolymer comprising from 60 to 95% by weight of ethylene and from 5 to 40% by weight of an unsaturated aliphatic carboxylic acid, and (C-3) a copolymer comprising from 60 to 95% by weight of ethylene and from 5 to 40% by weight of an unsaturated aliphatic monocarboxylic acid alkyl ester.

From the standpoint of transparency, the stretch-wrapping films of the present invention preferably include a film obtained by blown-film extrusion of a laminate composed of an intermediate layer comprising from 40 to 95% by weight of (A-1) an ethylene-α-olefin copolymer or (A-2) a propylene-ethylene-α-olefin random copolymer or propylene-α-olefin random copolymer, from 5 to 50% by weight of (B-3) an olefin type thermoplastic elastomer, and from 0 up to 25% by weight of an ethylene-vinyl acetate copolymer having laminated on both sides thereof a surface layer comprising (C-1) an ethylene-vinyl acetate copolymer at a blow-up ratio of from 3 to 7; and a film obtained by blown-film extrusion of a laminate composed of an intermediate layer comprising from 40 to 95% by weight of (A-3) a butene-1 polymer, from 5 to 50% by weight of (B-3) an olefin type thermoplastic elastomer, and from 0 up to 25% by weight of an ethylene-vinyl acetate copolymer having laminated on both sides thereof a surface layer comprising (C-1) an ethylene-vinyl acetate copolymer at a blow-up ratio of from 3 to 7.

The present invention further relates to a process for producing a stretch-wrapping film comprising coextruding a blown film having the above-described three-layer laminate structure from a tubular die and inflating the extruded tubular film while soft to obtain a blown film.

Known processes for producing thin films include a process in which an extruded film is cooled without blowing up and stretched at a temperature lower than the melting point of the film resin by at least 5° C. at a stretch ratio of from 2 to 20 to obtain an oriented film and a process in which a flat sheet extruded from a T-die is biaxially stretched at a temperature lower than the melting point of the film resin by at least 5° C. at a stretch ratio of from 4 to 12 in each direction to obtain an oriented film. However, an oriented film obtained by these processes not only requires a large force in stretch-wrapping but is easily torn due to low strain recovery.

DETAILED DESCRIPTION OF THE INVENTION

Figure 1:
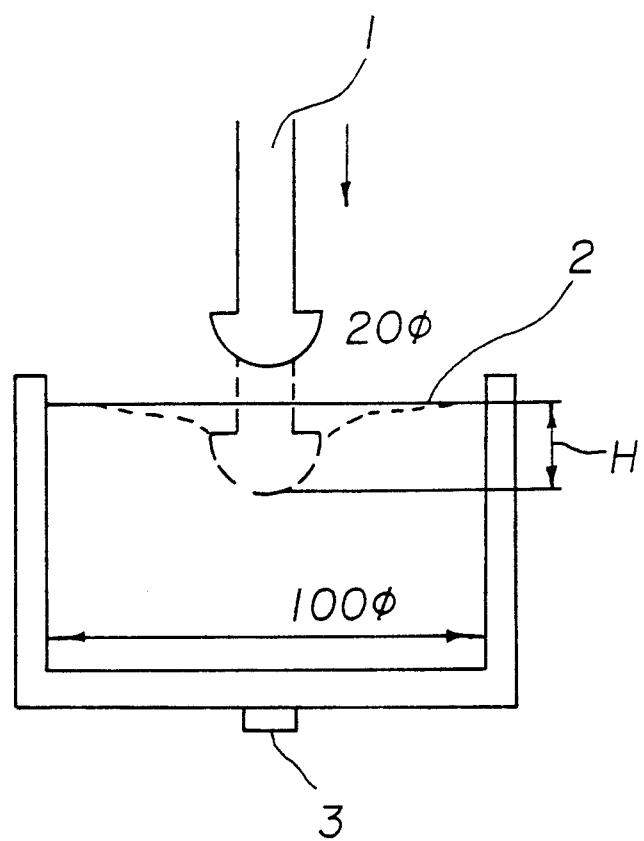
FIG. 1 shows a plane view of a tester for determining a deformation recovery of film samples.

The ethylene-α-olefin copolymer as component (A-1) which can be used in the present invention is a copolymer of ethylene and an α-olefin having from 4 to 8 carbon atoms, e.g., butene-1, hexene-1, 4-methylpentene-1, and octene-1. Component (A-1) has an ethylene content of from 80 to 98% by weight, an α-olefin content of from 2 to 20% by weight, and preferably from 4 to 20% by weight, a density of from 0.88 to 0.93 g/c$^3$, and preferably from 0.88 to 0.925 g/cm$^3$, and an MFR of from 0.1 to 5 g/10 min, and preferably from 0.5 to 4 g/10 min, as measured at 190° C. under a load of 2.16 kg (JIS K-6760).

If the α-olefin content in component (A-1) is less than 2% by weight, the film lacks in stretchability and softness and exhibits insufficient improvement in tear strength. If it exceeds 20% by weight, sufficient tension is hardly obtained. If the MFR is less than 0.1 g/10 min, the film is hard and less stretchable. If it exceeds 5 g/10 min, the film has reduced strength and is easily broken during wrapping operation.

The propylene-ethylene-α-olefin random copolymer or propylene-α-olefin random copolymer as component (A-2) is a random copolymer of propylene and ethylene and/or an α-olefin having from 4 to 8 carbon atoms, e.g., butene-1, hexene-1, 4-methylpentene-1, and octene-1. Component (A-2) has an ethylene and/or α-olefin content of from 4 to 19% by weight, and preferably from 4 to 16% by weight, a propylene content of from 81 to 96% by weight, and an MFR of from 1 to 10 g/10 min, and preferably from 1 to 8 g/10 min, as measured at 230° C. under a load of 2.16 kg (JIS K-7210).

If the ethylene and/or α-olefin content in component (A-2) is less than 4% by weight, the film lacks in stretchability and softness and exhibits insufficient improvement in tear strength. If it exceeds 19% by weight, sufficient tension is hardly obtained. If the MFR is less than 1 g/10 min, the film is hard and less stretchable. If it exceeds 10 g/10 min, the film has reduced strength and is easily broken on wrapping.

The butene-1 polymer as component (A-3) is a butene-1 homopolymer which is a stereospecific high-molecular weight compound or an butene-1-ethylene copolymer having an ethylene content of from 0.1 to 10% by weight. Component (A-3) has a density of form 0.89 to 0.92 g/cm$^3$ and an MFR of from 0.1 to 10 g/10 min, and preferably from 0.15 to 8 g/10 min, as measured at 190° C. under a load of 2.16 kg (ASTM D1238E).

If the ethylene content of component (A-3) exceeds 10% by weight, sufficient tension is difficult to obtain. If the MFR is less than 0.1 g/10 min, the film is hard and less stretchable. If it exceeds 10 g/10 min, the film has reduced strength and is easily broken on wrapping.

The hydrogenated block copolymer elastomer as component (B-1) is a hydrogenation product of a block copolymer having, in the molecule thereof, a polymer block mainly comprising an alkenyl aromatic compound, e.g., ethylene, α-methylstyrene, p-methylstyrene, vinyltoluene, vinylxylene, etc., and preferably styrene or a derivative thereof, and a polymer block mainly comprising a conjugated diene compound, e.g., butadiene and isoprene, in which the former block is in a proportion of from 5 to 70% by weight, and preferably from 10 to 40% by weight, and the latter block is in a proportion of from 30 to 95% by weight, and preferably from 60 to 90% by weight.

If the former block is in a proportion of less than 5% by weight with the latter block exceeding 95% by weight, sufficient tension is hard to obtain. If the former block exceeds 70% by weight with the latter block less than 30% by weight, a desired deformation recovery cannot be obtained.

The weight average molecular weight of the former block preferably ranges from 5,000 to 125,000, and that of the latter block preferably ranges from 15,000 to 250,000.

A good number of processes have been proposed for the production of these block copolymers. Typically included is the process disclosed in JP-B-40-23798 (the term "JP-B" as used herein means an "examined published Japanese patent application"), in which block copolymerization is carried out in an inert solvent in the presence of a lithium catalyst or a Ziegler catalyst.

Hydrogenation of the block copolymer can be carried out, for example, in an inert solvent in the presence of a catalyst for hydrogenation according to known processes described, e.g., in JP-B-42-8704, JP-B-43-6636, and JP-B-46-20814. By this hydrogenation treatment, at least 50%, and preferably at least 80%, of the olefinic double bonds in the latter block and not more than 25% of the unsaturated bonds in the former block are hydrogenated. "KRATON-G" sold by Shell Chemical Co. and "TUFTEC" sold by Asahi Chemical Industry Co., Ltd. are among such hydrogenated block copolymers.

The 1,2-polybutadiene as component (B-2) is syndiotactic 1,2-polybutadiene having a 1,2-bond content of at least 90%, a degree of crystallinity of from 15 to 35%, a density of from 0.89 to 0.91 g/cm$^3$, and an MFR of from 0.1 to 5 g/10 min as measured at 150° C. (JIS K-7112D).

If the 1,2-bond content of component (B-2) is less than 90%, a desired deformation recovery cannot be obtained. If the MFR is less than 0.1 g/10 min, the film is hard and less stretchable. If it exceeds 5 g/10 min, the film has reduced strength and is easily broken on wrapping.

The ethylene-propylene copolymer elastomer or ethylene-butene-1 copolymer elastomer as component (B-3) is a copolymer of ethylene and propylene or butene-1 having a propylene or butene-1 content of from 10 to 30% by weight, an ethylene content of from 70 to 90% by weight, a density of from 0.86 to 0.91 g/cm$^3$, and an MFR of from 0.2 to 5 g/10 min as measured at 190° C. (ASTM D1238).

If the propylene or butene-1 content of component (B-3) is less than 10% by weight, a desired deformation recovery cannot be obtained. If it exceeds 30% by weight, sufficient tension is hard to obtain. If the MFR is less than 0.2 g/10 min, the film is hard and less stretchable. If it exceeds 5 g/10 min, the film has reduced strength and is easily broken on wrapping.

A compounding ratio of components (A) and (B) in the intermediate layer is from 50 to 95% by weight, and preferably from 55 to 90% by weight, for component (A) and from 5 to 50% by weight, and preferably from 10 to 45% by weight, for component (B).

If the proportion of component (B) is less than 5% by weight, a desired deformation recovery cannot be obtained. If it exceeds 50% by weight, the film has reduced transparency and reduced strength.

Compounding of the thermoplastic elastomer selected from the group (B). brings about improvements in stretchability and elasticity.

If desired, the intermediate layer may further contain an ethylene copolymer resin which is also used in surface layers hereinafter described, e.g., an ethylene-vinyl acetate copolymer, in a proportion of from 3 to 25% by weight. Where the flash is reused, it is incorporated into the intermediate layer.

Ethylene resins which can be used in the surface layer laminated on both sides of the intermediate layer include (C-1) an ethylene-vinyl acetate copolymer, (C-2) an ethylene-aliphatic unsaturated carboxylic acid copolymer, e.g., an ethylene-acrylic acid copolymer and an ethylene-methacrylic acid copolymer, and (C-3) an ethylene-aliphatic unsaturated monocarboxylic acid alkyl ester, e.g., an ethylene-ethyl acrylate copolymer and an ethylene-methyl methacrylate copolymer.

In particular, an ethylene-vinyl acetate copolymer having a vinyl acetate content of from 5 to 25% by weight and an MFR of from 0.3 to 5 g/10 min (190° C., 2.16 kg) is preferred as component (C).

For the purpose of endowing the films with properties required for stretch-wrapping films, such as moderate slip properties, self-tack, anti-fogging properties, and antistatic properties, it is recommended to incorporate into the intermediate layer and/or surface layers at least one of esters of an aliphatic alcohol having from 1 to 12 carbon atoms, and preferably from 1 to 6 carbon atoms, and a fatty acid having from 10 to 22 carbon atoms, and preferably from 12 to 18 carbon atoms, e.g., glycerol mono-oleate, glycerol di- or tri-oleate, glycerol triricinoleate, glycerol acetylricinoleate, methyl acetylricinoleate, ethyl acetylricinoleate, butyl acetylricinoleate, propylene glycol oleate, propylene glycol laurate, pentaerythritol oleate, polyethylene glycol oleate, polypropylene glycol oleate, polyoxyethylene glycerol, polyoxypropylene glycerol, sorbitan oleate, sorbitan laurate, polyethylene glycol sorbitan oleate, and polyethylene glycol sorbitan laurate; and polyalkylene ether polyols having preferably from 2 to 4 carbon atoms in the alkylene moiety thereof, e.g., polyethylene glycol and polypropylene glycol in a total amount of from 0.5 to 5% by weight, and preferably from 1 to 3% by weight.

The stretch-wrapping laminate film according to the present invention can be produced by melt-kneading the resin components for the intermediate layer and surface layers by means of separate extruders, feeding these resin compounds to a three-layered tubular die, co-extruding the three-layered laminate followed by inflation (blown-film extrusion) at a blow-up ratio of from 3 to 7.

The terminology "blow-up ratio" is a ratio of a circumference of a blown film finally obtained to that of the blown-film die slit. At a blow-up ratio high in the above-recited range, excellent deformation recovery properties can be assured in good balance with other properties essential for stretch-wrapping films, such as stretchability, softness, and tear strength and, at the same time, excellent gloss and transparency can be obtained.

The laminate film of the present invention preferably has a total thickness of from 8 to 30 μm, in which the intermediate layer is from 2 to 10 μm thick, with each surface layer being from 3 to 10 μm thick.

According to the present invention, the component selected from the group (A) for the intermediate layer serves to endow the film with stretchability and softness and also to increase tear strength and breaking strength. The component selected from the group (B) serves to endow the film with deformation recovery properties and softness and also to improve stretchability and tension.

The ethylene resin in the surface layers exhibits moderate tackiness for making the film fit close to trays or foodstuffs thereby performing stretch-wrapping with ease.

The present invention is now illustrated in greater detail with reference to Examples, but it should be understood that the present invention is not deemed to be limited thereto. All the percents, parts, and ratios are by weight unless otherwise indicated.

EXAMPLES 1 TO 8 AND COMPARATIVE EXAMPLES 1 AND 2

Component (A) and component (B) shown in Table 1 below were kneaded in an extruder (diameter: 65 mm; L/D ratio: 25) at 185° C. to prepare a resin compound for an intermediate layer.

Separately, 98.5% of an ethylene-vinyl acetate copolymer (vinyl acetate content: 15%; MFR at 190° C.: 2.0 g/10 min) and 1.5% of glycerol monooleate ("Rikemal OL 100" produced by Riken Vitamin Oil Co., Ltd.) were kneaded in an extruder (diameter: 50 mm; L/D ratio: 25) at 160° C. to prepare a resin compound for surface layers.

The two resin compounds prepared above were fed to a three-layered tubular die and blow-film extruded at a die temperature of 185° C. and at a blow-up ratio of 5.0 to obtain a stretch-wrapping laminate film having a total thickness of 13 μm, comprised of a 5 μm thick intermediate layer comprising components (A) and (B) and a 4 μm thick surface layer comprising an ethylene-vinyl acetate copolymer on each side thereof.

A tester shown in FIG. 1 was used. Piston rod 1 having a diameter of 20 mm was indented onto the center of test film 2 fixed on a circular edge of a load cell 3 at a speed of 500 mm/min and then backed up. The maximum depth (H) of indentation of the film which disappeared within 3 minutes from the removal of the piston was measured.

6) Stretchability

TABLE 1

| Example No. | (A-1) Et/Bt[1] | (A-2) Pr/Et/Bt[2] | (A-3) PBt[3] | (A-3) Bt/Et[4] | (B-1) H-St/Bd[5] | (B-1) H-St/Bd[6] | (B-2) 1,2-PBd[7] | (B-3) Et/Pr[8] | (B-3) Et/Bt[9] |
|---|---|---|---|---|---|---|---|---|---|
| Example 1 | — | 20 | 60 | — | 20 | — | — | — | — |
| Example 2 | — | — | 60 | — | 40 | — | — | — | — |
| Example 3 | — | 60 | — | — | 40 | — | — | — | — |
| Example 4 | — | 20 | 60 | — | — | 20 | — | — | — |
| Example 5 | 60 | — | — | — | — | — | 40 | — | — |
| Example 6 | — | 20 | — | 60 | 20 | — | — | — | — |
| Example 7 | — | — | 70 | — | — | — | — | 30 | — |
| Example 8 | — | — | 70 | — | — | — | — | — | 30 |
| Comparative Example 1 | 100 | — | — | — | — | — | — | — | — |
| Comparative Example 2 | — | 100 | — | — | — | — | — | — | — |

Note:
[1] Ethylene-butene-1 copolymer (butene-1 content: 15%; density: 0.900 g/cm$^3$; MFR (190° C.): 1.0 g/10 min)
[2] Propylene-ethylene-butene-1 random copolymer (ethylene content: 2.0%; butene-1 content: 13.0%; density: 0.908 g/cm$^3$; MFR (230° C.): 5.0 g/10 min)
[3] Polybutene-1 (density: 0.915 g/cm$^3$; MFR (190° C.): 1.8 g/10 min; "M 0200" produced by Shell Chemical Co.)
[4] Butene-1-ethylene copolymer (ethylene content: 0.7%; density: 0.908 g/cm$^3$; MFR (190° C.): 1.0 g/10 min; "M 8640" produced by Shell Chemical Co.)
[5] Hydrogenated styrene-butadiene block copolymer elastomer (styrene block content: 20%; density: 0.89 g/cm$^3$; MFR (200° C.): 9.5 g/10 min; "TUFTEC H 1052" produced by Asahi Chemical Industry Co., Ltd.)
[6] Hydrogenated styrene-butadiene block copolymer elastomer (styrene block content: 35%; density: 0.91 g/cm$^3$; MFR (200° C.): 3.5 g/10 min; "TUFTEC H1041" produced by Asahi Chemical Industry Co., Ltd.)
[7] 1,2-Polybutadiene (density: 0.901 g/cm$^3$; MFR (150° C.): 3 g/10 min; "BP 810" produced by Japan Synthetic Rubber Co., Ltd.)
[8] Ethylene-propylene copolymer elastomer (propylene content: 22%; density: 0.86 g/cm$^3$; MFR (190° C.): 3.2 g/10 min; "EP 911P" produced by Japan Synthetic Rubber Co., Ltd.)
[9] Ethylene-butene-1 copolymer elastomer (butene-1 content: 11%; density: 0.91 g/cm$^3$; MFR (190° C.): 2 g/10 min)

Physical characteristics and suitability to stretch-wrapping of the resulting film were evaluated according to the following test methods. The results obtained are shown in Table 2 below.

1) Haze
Measured in accordance with JIS K-6714.
2) Surface Gloss
Measured in accordance with JIS Z-8741-62 (20° C.).
3) Tensile Strength at Break and Tensile Elongation at Break
Measured in accordance with JIS Z-1702.
4) Elmendorf Tear Strength
Measured in accordance with JIS Z-1702.
5) Deformation Recovery Meat, fish or vegetables were put on trays made of expanded polystyrene, oriented polystyrene, or impact resistant polystyrene and stretch-wrapped with a sample film by using an automatic stretch-wrapping machine "A-18X" manufactured by Fuji Pack System Co., Ltd., and the stretch state of the film was observed with eyes. Films which stretched substantially uniformly were rated "good".

7) Occurrence of Tearing
Stretch-wrapping was conducted in the same manner as in 6) above, and occurrence of tearing was observed with eyes.
8) Occurrence of Wrinkling
Stretch-wrapping was conducted in the same manner as in 6) above, and occurrence of wrinkling was observed with eyes.

TABLE 2

| Example No. | Film Properties | | | | | Suitability to Stretch-Wrapping | | |
|---|---|---|---|---|---|---|---|---|
| | Haze (%) | Gloss (%) | Elmendorf Tear Strength (LD/TD) (kg/cm) | Tensile Strength at Break (LD/TD) (kg/cm$^2$) | Tensile Elongation at Break (LD/TD) (%) | Deformation Recovery (mm) | Stretch-ability | Occurrence of Tearing | Occurrence of Wrinkling |
| Example 1 | 2.3 | 92 | 110/35 | 460/420 | 210/530 | 20 | good | no tear | no wrinkle |
| Example 2 | 2.3 | 72 | 56/35 | 420/400 | 210/520 | 20 | " | " | " |
| Example 3 | 2.0 | 76 | 72/141 | 340/330 | 320/590 | 17 | " | " | " |
| Example 4 | 2.4 | 84 | 105/35 | 450/410 | 200/540 | 19 | " | " | " |
| Example 5 | 1.3 | 85 | 92/80 | 370/340 | 240/460 | 20 | " | " | " |
| Example 6 | 2.4 | 87 | 106/35 | 460/430 | 200/520 | 20 | " | " | " |
| Example 7 | 2.0 | 95 | 91/53 | 330/310 | 230/550 | 20 | " | " | " |

TABLE 2-continued

| Example No. | Haze (%) | Gloss (%) | Film Properties | | | | Suitability to Stretch-Wrapping | | |
|---|---|---|---|---|---|---|---|---|---|
| | | | Elmendorf Tear Strength (LD/TD) (kg/cm) | Tensile Strength at Break (LD/TD) (kg/cm²) | Tensile Elongation at Break (LD/TD) (%) | Deformation Recovery (mm) | Stretchability | Occurrence of Tearing | Occurrence of Wrinkling |
| Example 7 | | | | | | | | | |
| Example 8 | 2.2 | 88 | 85/40 | 380/340 | 220/520 | 17 | " | " | " |
| Compar. Example 1 | 2.7 | 74 | 23/120 | 250/250 | 300/520 | 8 | " | sometimes tearing occurred | slight wrinkles observed |
| Compar. Example 2 | 2.2 | 88 | 40/290 | 330/290 | 370/550 | 7 | " | no tear occurred | slight wrinkles observed |

While the invention has been described in detail and with reference to specific embodiments thereof, it will be apparent to one skilled in the art that various changes and modifications can be made therein without departing from the spirit and scope thereof.

What is claimed is:

1. A laminate film for stretch-wrapping which comprises an intermediate layer containing from 50 to 95% by weight of at least one member selected from the group (A) consisting of (A-1) an ethylene-α-olefin copolymer comprising ethylene and an α-olefin having from 4 to 8 carbon atoms, having an α-olefin content of from 2 to 20% by weight, and having a melt flow rate of from 0.1 to 5 g/10 min at 190° C., (A-2) a propylene-ethylene-α-olefin random copolymer or propylene-α-olefin random copolymer comprising propylene, ethylene and/or an α-olefin having from 4 to 8 carbon atoms, having an ethylene and/or α-olefin content of from 4 to 19% by weight and a propylene content of from 81 to 96% by weight, and having a melt flow rate of from 1 to 10 g/10 min at 230° C., and (A-3) a butene-1 homopolymer or butene-1-ethylene copolymer having an ethylene content of from 0.1 to 10% by weight having a melt flow rate of from 0.1 to 10 g/10 min at 190° C. and from 5 to 50% by weight of a hydrogenated block copolymer elastomer which is a hydrogenation product of a block copolymer containing, in the molecule thereof, from 5 to 70% by weight of a polymer block mainly comprising an alkenyl aromatic compound and from 30 to 95% by weight of a polymer block mainly comprising a conjugated diene compound, having laminated on both sides thereof a surface layer comprising from 75 to 95% by weight of ethylene and from 5 to 25% by weight of a vinyl acetate copolymer.

2. A laminate film for stretch-wrapping as claimed in claim 1, wherein said surface layer comprises an ethylene-vinyl acetate copolymer having a melt flow rate of from 0.3 to 5 g/10 min.

3. A laminate film for stretch-wrapping as claimed in claim 1, wherein said laminate film is from 8 to 30 μm thick, with said intermediate layer being from 2 to 10 μm thick, and said surface layers each being from 3 to 10 μm thick.

4. A laminate film for stretch-wrapping as claimed in claim 1, wherein said surface layer further contains from 0.5 to 5% by weight of an aliphatic alcohol fatty acid ester between an aliphatic alcohol having from 1 to 12 carbon atoms and a fatty acid having from 10 to 22 carbon atoms or a polyalkylene ether polyol having from 2 to 4 carbon atoms i the alkylene moiety thereof.

5. A laminate film for stretch-wrapping as claimed in claim 1, wherein (A) is (A-1).

6. A laminate film for stretch-wrapping as claimed in claim 1, wherein (A) is (A-2).

7. A laminate film for stretch-wrapping as claimed in claim 1, wherein (A) is (A-3).

8. A laminate film for stretch-wrapping as claimed in claim 5, having an α-olefin content of from 4 to 20% by weight.

9. A laminate film for stretch-wrapping as claimed in claim 6, having an ethylene and/or α-olefin content of from 4 to 16% by weight.

10. A laminate film for stretch-wrapping as claimed in claim 7, having melt flow rate of from 0.15 to 8 g/10 min at 190° C.

11. A laminate film for stretch-wrapping as claimed in claim 1, wherein the alkenyl aromatic compound is styrene.

12. A laminate film for stretch-wrapping as claimed in claim 1, having a hydrogenated block copolymer elastomer which is a hydrogenation product of a block copolymer containing, in the molecule thereof, from 10 to 40% by weight of a polymer block mainly comprising an alkenyl aromatic compound.

13. A laminate film for stretch-wrapping as claimed in claim 12, wherein the alkenyl aromatic compound is styrene.

14. A laminate film for stretch-wrapping as claimed in claim 1, wherein the weight average molecular weight of the polymer block mainly comprising an alkenyl aromatic compound is from 5,000 to 125,000, and the weight average molecular weight of the polymer block mainly comprising a conjugated diene compound is from 15,000 to 250,000.

15. A laminate film for stretch-wrapping as claimed in claim 14, wherein the alkenyl aromatic compound is styrene.

* * * * *